Feb. 27, 1962 W. R. TAYLOR 3,022,798
HOT FLUID-COLD FLUID MIXING VALVE
Filed Aug. 29, 1957
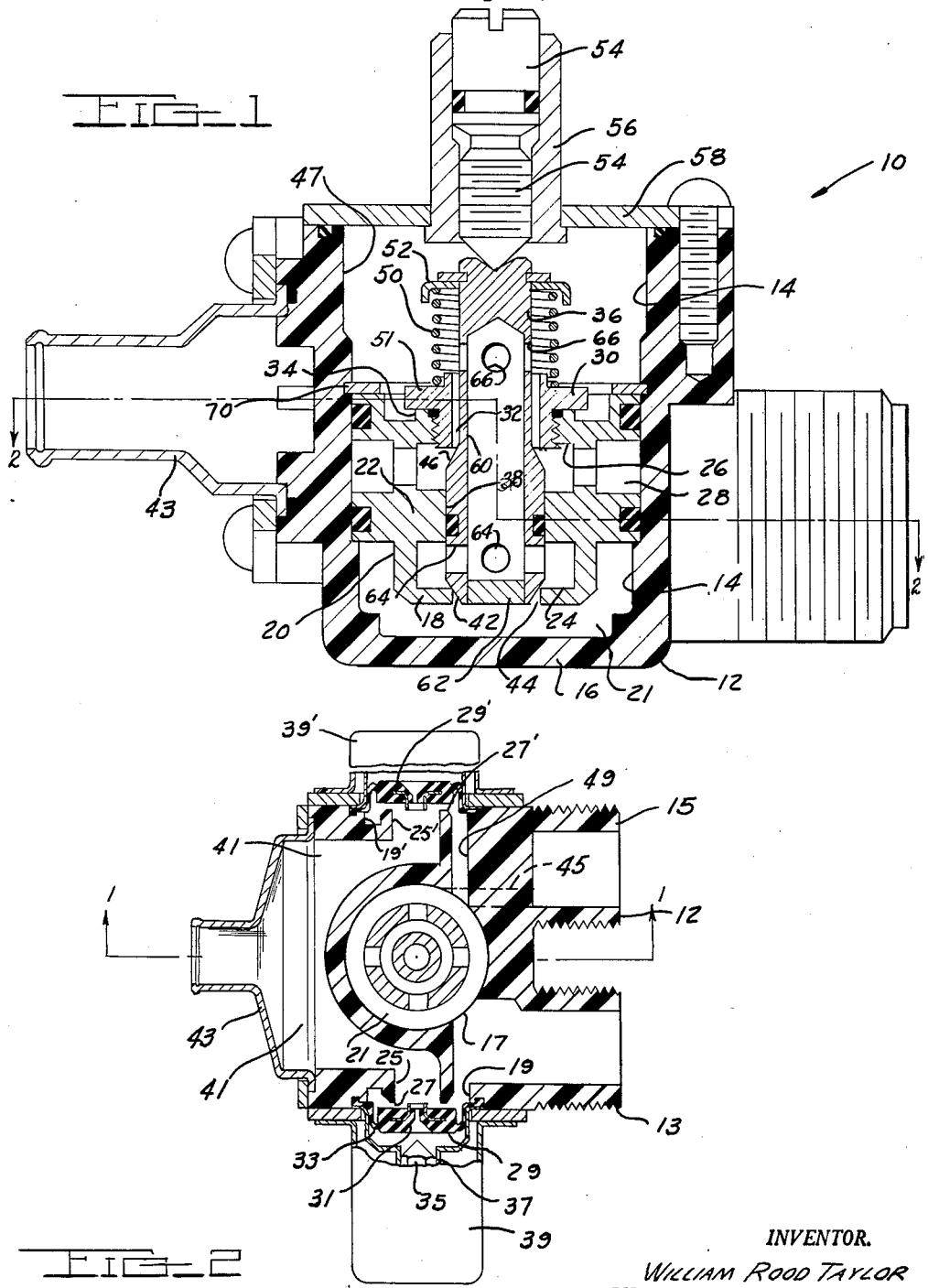
INVENTOR.
WILLIAM ROOD TAYLOR
BY
SMITH, OLSEN, LEWIS & McRAE

United States Patent Office 3,022,798
Patented Feb. 27, 1962

3,022,798
HOT FLUID-COLD FLUID MIXING VALVE
William Rood Taylor, Western Springs, Ill., assignor to American Radiator & Standard Sanitary Corporation, New York, N.Y., a corporation of Delaware
Filed Aug. 29, 1957, Ser. No. 681,120
5 Claims. (Cl. 137—606)

This invention relates to a mixing valve useful for mixing valve useful for mixing hot and cold fluids, as for example in the mixing of hot and cold water prior to entry thereof into the tub of an automatic clothes washing machine.

Objects of the invention are to provide a mixing valve wherein:

(1) The valve can be controlled to provide three separate outlet fluid temperatures, (2) The valve can be adjusted to vary at least one of the outlet fluid temperatures, (3) The above mentioned adjustment can be effected with minimum resistance from the fluids within the valve, thereby requiring a minimum adjusting force and enabling employment of a flexible cable for applying the adjusting force, this arrangement permitting the valve to be positioned at various different locations remote from the point of application of the adjusting force, (4) The valve employs a minimum of parts, whereby to enable low cost manufacture, and (5) The valve is of such design as to have a long service life.

Other objects of this invention will appear in the following description and appended claims, reference being had to the accompanying drawings forming a part of this specification wherein like reference characters designate corresponding parts in the several views.

In the drawings:

FIG. 1 is a sectional view through one embodiment of the invention, taken on line 1—1 in FIG. 2.

FIG. 2 is a sectional view taken substantially on line 2—2 in FIG. 1, with certain parts shown schematically and other parts shown out of position to better illustrate the action of the valve.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a mixing valve 10 including a nylon valve housing body 12 having a threaded inlet conduit 13 for the hot fluid and a threaded inlet conduit 15 for cold fluid.

Conduit 13 discharges through an opening 17 into a hot fluid inlet chamber 21. Conduit 13 also connects with an annular passage section 19 which surrounds a passage section 25 to define a valve surface 27. A flexible diaphragm 29 overlies surface 27 to coact therewith in controlling fluid flow from section 19 into section 25. Diaphragm 29 is provided with a central opening 31 and a bleed opening 33. An armature plunger 35 is arranged in a guide 37 to move toward and away from opening 31, the arrangement being such that when solenoid 39 is electrically energized plunger 35 is in its FIG. 2 position away from opening 31 so as to permit the fluid pressure in passage section 19 to hold the diaphragm open. When solenoid 39 is de-energized a compression spring in the outer end of guide 37 (not shown) urges plunger 35 to a position closing opening 31; as a result the fluid in passage 19 is enabled to flow through bleed opening 33 so as to develop a pressure on the outer face of the diaphragm sufficient to force it into a closed position against valve surface 27.

When diaphragm 29 is open fluid may flow from passage 19 through passage 25 into an outlet chamber 41 partially formed by a spigot 43.

Cold fluid conduit 15 discharges into a cold fluid inlet chamber 28 through a passage 45. In FIG. 2 passage 45 is out of position but is included in FIG. 2 to illustrate the flow of fluid through the valve.

Chamber 28 is in limited communication with a hot fluid-cold fluid mixing chamber 47, which discharges into a passage 49. Passage 49 is provided with an annular section 19' which surrounds an outlet passage section 25' to define an annular valve surface 27'. Fluid flow from section 19' into section 25' is controlled by a diaphragm 29' operating in the same manner as previously described diaphragm 29; accordingly similar "primed" reference numerals are employed for similar parts. Passage section 25' discharges into outlet chamber 41 where it mixes with the fluid issuing from passage 25.

From the above description it will be appreciated that when diaphragm 31 is open and diaphragm 31' is closed the fluid issuing from spigot 43 will be at a maximum temperature (determined by the temperature of the fluid supplied to conduit 13).

When diaphragm 31 is closed and diaphragm 31' is open all of the hot fluid from conduit 13 must pass through opening 17, from where it is subsequently mixed with the cold fluid from conduit 15; consequently the fluid issuing from spigot 43 is at a relatively low temperature (the exact temperature being determined by the setting of slide valve 36).

When diaphragm 31 and diaphragm 31' are both open the hot fluid through passage 25 is mixed with the "low temperature" fluid from passage 25' to produce an intermediate temperature fluid at spigot 43.

Referring now to the "mixing mechanism" shown in FIG. 1 it will be noted that housing body 12 is provided with a substantially cylindrical recess 14. The bottom wall 16 of body 12 cooperates with wall 18 of an insert member 20 to form the previously mentioned inlet chamber 21 for hot fluid.

Insert 20 also includes a wall 22 which partially defines a "receiver" chamber 24, taking its entire fluid supply from chamber 21. The top wall 26 of insert 20 cooperates with wall 22 to define cold fluid inlet chamber 28. A retainer ring 70 overlies wall 26 to fixedly retain insert 20 within recess 14.

The exit port for chamber 28 is defined by a removable threaded tubular element 30 having a port-forming opening 32 extending therethrough. In its installed position element 30 is screwed into wall 26 until its annular flange 51 abuts against the top surface of flange 34. For operational purposes element 30 may be considered as combining with wall 26 to form a single wall, the only purpose in making element 30 removable is to permit installations of slide valve 36.

Valve 36 freely extends through an opening 38 in wall 22 and into chamber 24 so as to present annular shoulder 42 to the downstream edge of the port formed by opening 44. Valve 36 is also provided with a shoulder 46 which registers with the upstream edge of the port formed by opening 32. The spacing of the shoulder surfaces 42 and 46 is less than the spacing between openings 44 and 32 so as to permit an axial adjustment of valve 36 for varying the relative amounts of hot and cold fluids discharged into mixing chamber 47.

In operation of the valve slide valve 46 does not reciprocate in accordance with pressure differentials; rather, slide valve 46 is adjusted to a stationary position. The adjusting mechanism includes a compression coil spring 50 which is positioned between flange 51 and an abutment collar 52 carried by valve element 36. The upper end of element 36 is pressuringly engaged by an adjustment screw 54 meshed with the threads of an internally threaded sleeve 56 carried by cover element 58. It will be appreciated that screw 54 opposes the biasing action of spring 50, the action being such that adjustment of screw 54 upwardly in sleeve 56 is effective to allow spring 50 to move valve element 36 upwardly in a manner tending to open port 44 and close port 46. Any desired port opening can be achieved, from fully closed to fully open.

Valve element 36 is longitudinally drilled out to provide a central passage 60, which is closed at its lower end by a plug 62. Four radial holes 64 are drilled in the lower end of element 36, and four radial holes 66 are drilled in the upper end of element 36.

In operation of element 36, with the element in its FIG. 1 position hot fluid in chamber 21 is prevented from flowing through port 44. Cold fluid in chamber 28 is free to flow through port 32 into mixing chamber 47 (from where it can be ultimately discharged into chamber 41 via passages 49, 19′ and 25′).

When screw 54 is adjusted upwardly in sleeve 56 so as to partially open port 44 a controlled quantity of hot fluid in chamber 21 is free to flow through port 44, into chamber 24, through holes 64, passage 60, holes 66 and into mixing chamber 47, where it mixes with the cold fluid from port 32.

When screw 54 is adjusted upwardly sufficient to put shoulder 46 in engagement with wall 30 the flow of hot fluid through port 44 is at a maximum and the flow of cold fluid through port 32 is halted.

It will be noted that the "oppositely facing" character of shoulders 42 and 46 is such that the fluid pressure in chamber 21 tends to move element 36 upwardly while the fluid pressure in chamber 28 tends to move element 36 downwardly. In other words, the two fluid pressures tend to balance each other, whereby to enable element 36 to be adjusted with a minimum manual force applied onto screw 54. In this connection spring 50 is a fairly low strength spring, its strength being merely large enough to overcome any unbalance in the hot and cold fluid pressures.

Since the adjusting force or torque necessary to be applied onto screw 54 is relatively small the screw can be attached to the end of a flexible cable (not shown) and the cable turned from a remote point. This feature permits a wide choice in the location of valve body 10. In prior art devices the necessary adjusting torque was relatively high so as to rule out the use of a flexible cable in the manner contemplated in the present invention.

The illustrated valve is of fairly low cost construction, the parts thereof being easily assembled together. In the assembly of the valve, insert 20, slide valve 36 and spring 50 can be assembled together prior to placement within recess 14. When retainer ring 70 is in place cover 58 (with sleeve 56 thereon) can be secured onto the valve housing in its illustrated position.

I claim:

1. A mixing valve comprising an internally partitioned valve body structure defining two axially aligned separate inlet chambers and a mixing chamber, together with a receiver chamber for receiving fluid from one of the inlet chambers; an axially adjustable valve extending through the mixing chamber, the other inlet chamber and receiver chamber; said receiver chamber being connected with its inlet chamber by a first port, and the other inlet chamber being connected to the mixing chamber by a second port; said axially adjustable valve having a central passage therethrough placing the receiver chamber in communication with the mixing chamber; said valve having an imperforate reduced diameter portion thereof clearingly extending through the second port to cooperate therewith in defining a path for fluid flow from the other inlet chamber to the mixing chamber; said axially adjustable valve also having two oppositely facing valve surfaces registering with the ports but spaced distances apart less than the port spacing so that axially adjustable movement of the valve is effective to vary the relative flows through the respective ports.

2. A mixing valve comprising a valve housing; a first interior wall within said housing and cooperating therewith to define an inlet chamber for fluid of one temperature; a first inlet into said housing communicating with said inlet chamber; a second interior wall connected with the first wall and cooperating therewith to define a separate chamber for receiving fluid from the aforementioned inlet chamber; a third interior wall within the housing and cooperating with the second wall to define an inlet chamber for fluid of a second temperature; a second inlet into said housing communicating with said inlet chamber for fluid of a second temperature; the space between the third wall and adjacent interior surface of the housing constituting a mixing chamber; said first, second and third walls having aligned openings therein; a slide valve extending through the opening in said second wall and having two oppositely facing shoulders, one of which registers with the downstream edge of the opening in the first wall, and the other of which registers with the upstream edge of the opening in the third wall; a central passage extending within the slide valve and communicating with the mixing chamber; holes formed in said slide valve adjacent said one shoulder, whereby to put the central passage in communication with the separate receiver chamber; spring means biasing the slide valve toward a position with a shoulder thereof engaging the edge of its adjacent opening; abutment means engaging the slide valve and resisting the action of the spring means; and means for moving the abutment means in a direction parallel to the axis of the aligned openings, whereby to adjust the relative spacing between the shoulders and their adjacent openings; the arrangement being such that fluid in the second inlet chamber flows past said other shoulder into the mixing chamber, and fluid in the first inlet chamber flows past said one shoulder into the separate receiver chamber and thence into the mixing chamber via the slide valve holes and central passage.

3. A mixing valve comprising a valve housing; a first interior wall within said housing and cooperating therewith to define an inlet chamber for fluid of one temperature; a first inlet into said housing communicating with said inlet chamber; a second interior wall connected with the first wall and cooperating therewith to define a separate chamber for receiving fluid from the aforementioned inlet chamber; a third interior wall within the housing and cooperating therewith to define an inlet chamber for fluid of a second temperature; a second inlet into said housing communicating with said inlet chamber for fluid of a second temperature; the space between the third wall and adjacent interior surface of the housing constituting a mixing chamber; said first, said second and said third walls having aligned openings therein; a slide valve extending through the opening in said second wall and having two oppositely facing shoulders, one of which registers with the downstream edge of the opening in the first wall, and the other of which registers with the upstream edge of the opening in the third wall; a central passage extending within the slide valve and communicating with the mixing chamber; holes formed in said slide valve adjacent said one shoulder, whereby to put the central passage in communication with the separate receiver chamber; and means for adjusting the position of the slide valve in a direction parallel to the axis of the aligned openings, whereby to adjust the relative spacing between the shoulders and their adjacent openings; the arrangement being such that fluid in the second inlet chamber flows past said other shoulder into the mixing chamber, and fluid in the first inlet chamber flows past said one shoulder into the separate receiver chamber and thence into the mixing chamber via the slide valve holes and central passage.

4. A mixing valve comprising a valve housing having two inlets for fluids of different temperatures, a mixing chamber, and a discharge outlet in communication with the mixing chamber; means forming a fluid bypass within the valve housing from one inlet to the discharge outlet; electrically-controlled shut-off means positioned on the valve housing and controlling flow through said fluid bypass; second electrically-controlled shut-off means positioned on the valve housing and controlling flow from the mixing chamber to the discharge outlet; and metering means for delivering fluid streams of various preselected magnitudes from each of the inlets to the mixing chamber; said metering means comprising structural components within the housing cooperating therewith to define a second chamber communicating with one inlet to receive fluid therefrom, and a third chamber communicating with the other inlet to receive fluid therefrom; said metering means further including an elongated hollow valve element extending centrally within the second and third chambers for adjusting movements in the direction of its length, and an externally-actuable operator having a thrust connection with the hollow valve element to move same various preselected increments of distance to set the element in various rigid positions of elongational adjustment; said hollow valve element having first and second longitudinally spaced flow-throttling surfaces, and the aforementioned structural components including fixed wall elements defining first and second separate axially spaced seating surfaces surrounding the hollow valve element in axial registry with respective ones of the flow-throttling surfaces; the spacing between the two flow-throttling surfaces being different than the spacing between the two seating surfaces so that longitudinal movement of the flow-throttling element by the external operator is effective to increase the flow space between one throttling surface and its registering seat and to simultaneously decrease the flow space between the other throttling surface and its registering seat, and vice versa; said hollow valve element having port means therein for accepting fluid after its passage past the first seat and conveying same into the hollow interior of the element; said element also having second port means disposed longitudinally remote from the first port means to discharge fluid from the element interior into the mixing chamber; those fixed wall elements which define the second seating surface being spaced radially from the outer surface of the tubular valve element to cooperate therewith in forming a passage for conveying fluid from said second seating surface to the mixing chamber.

5. The combination of claim 4 wherein the electrically-controlled shut-off means are positioned on opposite sides of the valve element, and the elongated hollow valve element extends within the valve housing in a direction at right angles to an imaginary line interconnecting the two shut-off means.

References Cited in the file of this patent

UNITED STATES PATENTS

| | | |
|---|---|---|
| 1,494,543 | Hazeltine | May 20, 1924 |
| 2,528,422 | Chace | Oct. 31, 1950 |
| 2,601,989 | Modes | July 1, 1952 |
| 2,620,134 | Obermaier | Dec. 2, 1952 |
| 2,826,367 | Cobb | Mar. 11, 1958 |
| 2,851,057 | Fraser | Sept. 9, 1958 |